United States Patent [19]

Ormond

[11] Patent Number: 4,546,838
[45] Date of Patent: Oct. 15, 1985

[54] FLEXURE ISOLATED SHEAR WEB LOAD CELL

[76] Inventor: A. Newman Ormond, 12020 E. Rivera Rd., Santa Fe Springs, Calif. 90670

[21] Appl. No.: 633,288

[22] Filed: Jul. 23, 1984

[51] Int. Cl.⁴ ............... G01G 3/14; G01G 21/12
[52] U.S. Cl. ......................... 177/211; 177/255; 73/862.66
[58] Field of Search ............ 73/862.65, 862.66; 177/211, 255

[56] References Cited

U.S. PATENT DOCUMENTS

| | | | |
|---|---|---|---|
| 3,969,935 | 7/1976 | Shoberg | 73/862.66 |
| 4,143,727 | 3/1979 | Jacobson | 73/862.65 X |
| 4,338,825 | 7/1982 | Amlani et al. | 73/862.65 |
| 4,364,279 | 12/1982 | Stern et al. | 73/862.66 |

Primary Examiner—Harold Broome
Assistant Examiner—Patrick W. Foster
Attorney, Agent, or Firm—Ralph B. Pastoriza

[57] ABSTRACT

Load cells for weighing scales are provided with integrally formed flexures for preventing extraneous moments from affecting strain gauges secured to the load cells. The load cell itself includes in its simplest form a rectangular shaped body having cut-outs defining load carrying upper and lower arms and a vertical leg. Recessed areas are provided on opposite sides of the rectangular body between the upper and lower cut-outs to define a shear web to which strain gauges are attached. Flexure webs formed between the cut-outs in combination with further flexure webs formed at one of the ends of the load cell body effect the desired isolation.

7 Claims, 7 Drawing Figures

4,546,838

FLEXURE ISOLATED SHEAR WEB LOAD CELL

FIELD OF THE INVENTION

This invention relates generally to force measuring techniques and more particularly to improved flexure isolated shear web type load cells.

BACKGROUND OF THE INVENTION

It is common practice to utilize load cells for force measuring operations. Normally, the load cell may take the form of columns or shear webs having strain gauges affixed in a manner to provide an output signal indicative of the force applied to the load cell. One or more of the load cells in turn are usually connected to a structure designed with suitable flexure supports so that only desired components of forces to be measured will be transmitted to the load cells.

Improved operation of load cells has been effected by providing the load cell with integrally formed flexures for effecting the desired isolation. By providing such an integral arrangement, the expense of providing separate flexures and securing them between load cells and force applying structures is avoided.

In my U.S. Pat. Nos. 3,985,025 and 4,125,168 there are disclosed different types of load cells having integrally formed flexures. In the U.S. Pat. No. 3,985,025, the load cells have their opposite ends secured between a stationary structure and the peripheral edge of a platform so that the load cells are subject to bending forces when a load is applied on the platform. Strain gauges responsive to bending of specifically positioned flexures on the load cells provide the output signal. This patent also discloses the use of a shear web together with strain gauges attached to opposite sides of the shear web for measuring the bending moment.

My U.S. Pat. No. 4,125,168, is concerned with load cells symmetrical on either side of a vertical line passing through the center of the cell. These load cells can be disposed under opposite edges of a rectangular plate to provide a weighing scale In the load cells disclosed in this later patent, the strain gauges are responsive to bending moments. Shear webs are not used.

BRIEF DESCRIPTION OF THE PRESENT INVENTION

The present invention has to do with an improved load cell arrangement similar in certain respects to those load cells shown in my above-described U.S. patents. However, in the instant case, a shear web is utilized with strain gauges attached thereto for measuring the desired forces.

In its broadest aspect, the load cell comprises a rectangular integral body having opposite ends for securement to a stationary structure and a platform. The body itself has upper and lower symmetrical elongated cut-outs defining with the upper and lower exterior portions of the body load carrying horizontal arms. The same body also includes recesses on its opposite sides between the upper and lower cut-outs defining a thinned wall portion functioning as a vertical shear web to which strain gauges are attachable. A vertical elongated cut-out is provided having opposite ends adjacent to the ends of the upper and lower cut-outs closest to the second end of the body to define upper and lower flexure webs lying in a vertical plane normal to the plane of the shear web. There is further defined with the near vertical walls of the recesses a load carrying vertical leg. The load cell structure is completed by the provision of a vertical flexure web lying in a vertical plane parallel to the upper and lower flexure webs. This vertical flexure web is in alignment with the point of securement of the second end of the body to a platform so as to be in alignment with a force applied to this end of the load cell.

Forces applied by the platform are transmitted to the shear web by way of the upper and lower arms and the vertical leg, the vertical flexure web and upper and lower flexure webs isolating from the shear web extraneous moments caused by off-center loading of any platform to which the second end of the body is secured.

BRIEF DESCRIPTION OF THE DRAWINGS

A better understanding of this invention will be had by now referring to the accompanying drawings in which.

DETAILED DESCRIPTION OF THE INVENTION

Figure 1:
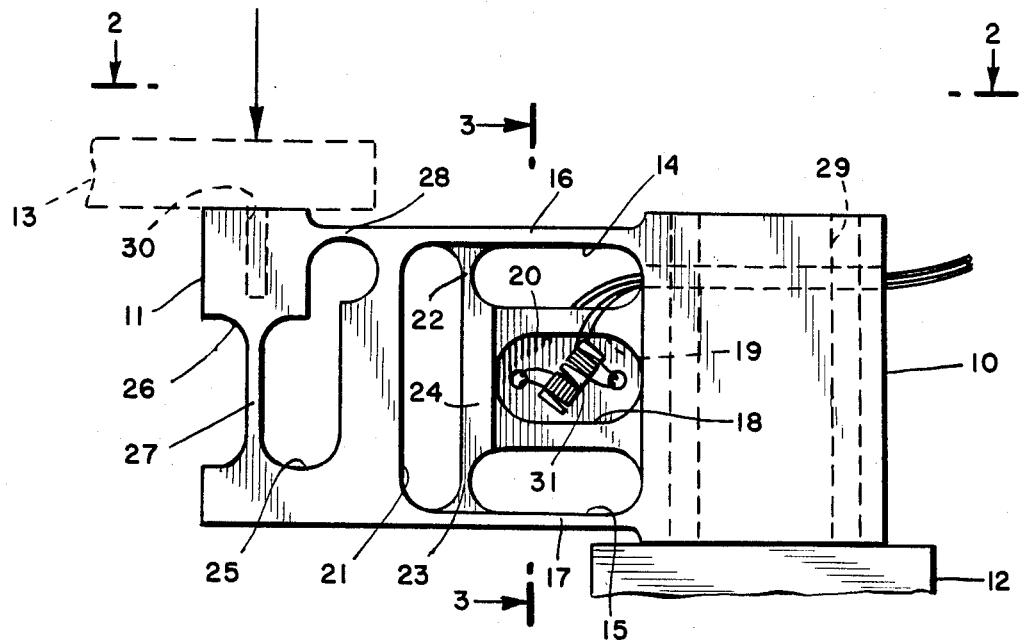
FIG. 1 is a side elevational view of a first simplified embodiment of the load cell of this invention.

Referring first to FIG. 1, the flexure isolated shear web load cell of the present invention includes a generally rectangular integral body having first and second ends 10 and 11. These ends are arranged to be secured respectively to a stationary structure such as indicated at 12 in the lower righthand portion of FIG. 1 and a platform, represented by the phantom lines 13 in the upper left portion of FIG. 1.

Upper and lower symmetrical elongated cut-outs 14 and 15 define with the upper and lower exterior portions of the body load carrying horizontal arms 16 and 17.

The body further includes recesses 18 and 19 on its opposite sides between the upper and lower cut-outs 14 and 15 defining a thinned wall portion functioning as a vertical shear web 20. Appropriate strain gauges are attachable to the walls of this shear web as will become clearer as the description proceeds.

Still referring to FIG. 1, there is shown a vertical elongated cut-out 21 having opposite ends adjacent to the ends of the upper and lower cut-outs 14 and 15 closest to the second end 11 of the body to define upper and lower flexure webs 22 and 23 lying in a vertical plane normal to the plane of the shear web 20. This vertical cut-out 21 further defines with the near vertical walls of the recesses 18 and 19 a load carrying vertical leg 24.

Referring to the left portion or second end of the body of FIG. 1, the load cell is completed by the provision of end cut-outs 25 and 26 defining therebetween a vertical flexure web 27 lying in a vertical plane parallel to the upper and lower flexure webs 22 and 23. This vertical flexure web 27 is in alignment with the point of securement of the second end 11 to the platform 13 such that a force applied by the platform is transmitted vertically through this flexure web.

In the particular embodiment illustrated in FIG. 1, there is also provided a horizontal flexure web 28 extending between the upper portion of the second end 11 of the body where it is to be secured to the platform 13 and the remaining portion of the body to bridge the upper portion of the end cut-out 25. This horizontal flexure web 28 will stabilize the second end relative to the vertical flexure web 27 when a relatively heavy force F is applied. For lighter loads, however, the horizontal flexure web 28 is not essential.

The means for securing the first and second ends of the load cell of FIG. 1 to the stationary structure 12 and platform 13 may take the form of appropriate bolts receivable within suitable bores formed in the first and second ends, such as at 29 and 30.

Figure 2:
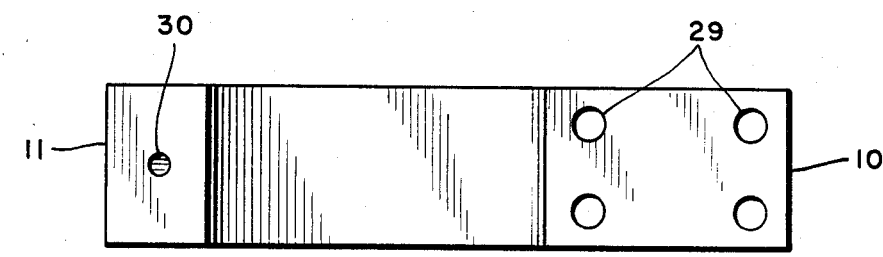
FIG. 2 is a top plan view of the load cell taken in the direction of the arrows 2—2 of FIG. 1.

FIG. 2 illustrates in top plan view the bores 29 and 30 more clearly.

Figures 3, 4:
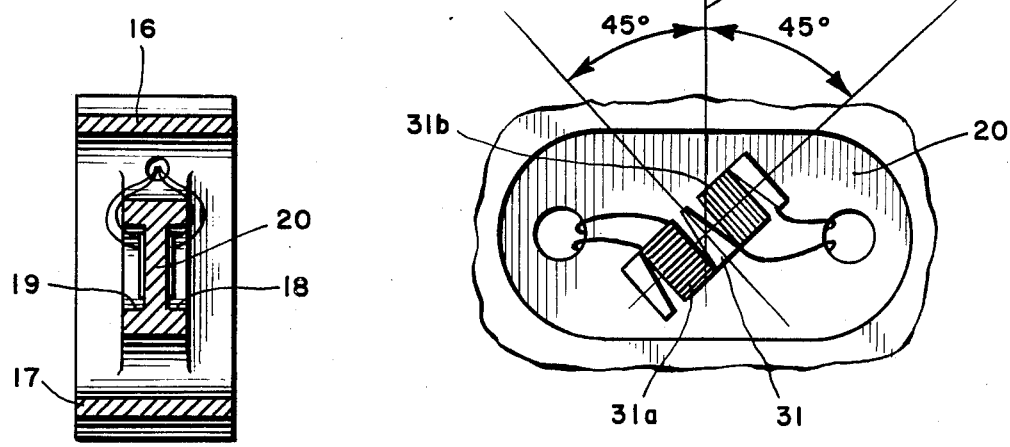
FIG. 3 is a cross section looking in the direction of the arrows 3—3 of FIG. 1.
FIG. 4 is an enlarged fragmentary elevational view of the central portion of the load cell of FIG. 1 illustrating details of the strain gauges attached to the load cell.

In FIG. 3, the recesses 18 and 19 are more clearly illustrated defining the shear web 20.

FIG. 4 illustrates strain gauge means 31 which might comprise a first section 31a and a second section 31b responsive to tension and compression strains respectively generated in the shear web 20 in response to the force F illustrated in FIG. 1.

In operation, and again referring to FIG. 1, when a force F is applied to the platform 13, it is transmitted to the second end 11 of the load cell. This force is transmitted to the shear web 20 by way of the upper and lower horizontal arms 16 and 17 and the vertical leg 24. More particularly, a tension is developed in the upper arm 16 and a compression in the lower arm 15. A force is transmitted down the vertical leg 24 and these forces result in generation of tension and compression shear stresses in the shear web 20 which are readily detectable by the strain gauges.

The vertical flexure web 27 to the left of FIG. 1 and the vertical flexure webs 22 and 23 connecting the upper and lower arms 16 and 17 with the vertical leg 24 isolate the shear web from extraneous moments such as occur from off-center loading of the platform 13 or from forces in a direction different from vertical; that is, forces having a horizontal component.

Maximum signal is obtained by orienting the strain gauges described in FIG. 4 at 45° to the vertical when a vertical force is applied and the load cell is oriented as illustrated in FIG. 1.

Figure 5:
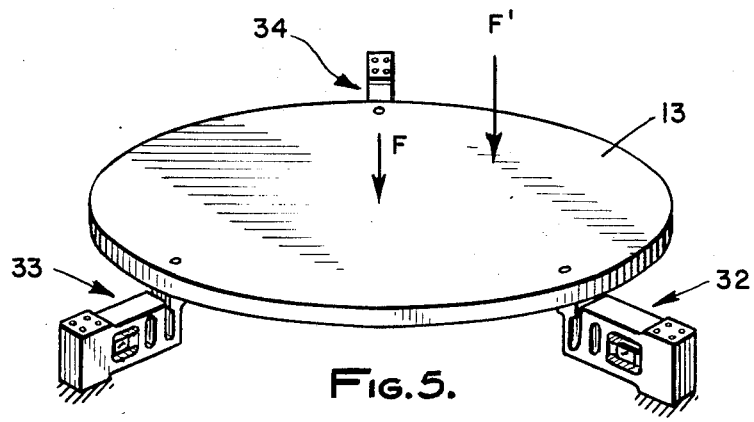
FIG. 5 is a perspective view of a weighing scale utilizing three of the load cells as described in FIG. 1.

In a very simple weighing scale, a platform such as 13 might be secured to the upper portion of the second end 11 of the load cell of FIG. 1, the single load cell serving as a measuring means. However, where a larger platform scale is desired, three load cells identical to that illustrated in FIG. 1 may be provided such as illustrated in FIG. 5. These three load cells are indicated at 32, 33 and 34 at equal circumferentially spaced points supporting the circular platform 13. In certain instances, only one additional load cell might be provided for supporting a platform, for example, at opposite ends.

An example of off-center loading is shown in FIG. 5 by the force F'. It can be appreciated that application of the off-center force can result in the generation of moments tending to twist the load cells. As stated, the various vertical flexure webs described will isolate the shear web from such moments.

Figure 6:
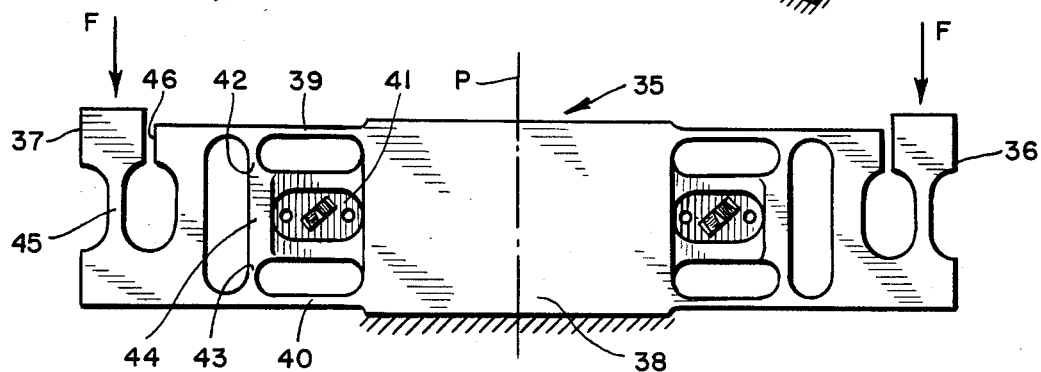
FIG. 6 is a side elevational view of a second embodiment of the load cell of this invention.

Referring now to FIG. 6, there is shown a second embodiment of the invention in the form of an elongated rectangular load cell having a central portion 35 and opposite end portions 36 and 37. The central portion 35 is arranged to be secured to a stationary structure schematically indicated at 38 while the opposite end portions 36 and 37 would engage under a platform and be subject to a loading force F.

In essence the load cell of FIG. 6 constitutes two of the load cells of FIG. 1 in back-to-back relationship integrally connected. Thus, the load cell of FIG. 6 has left and right sections which constitute identical structures on either side of a vertical plane P. Each of these load cell sections, in turn, are the same as the section described in FIG. 1, except for the lack of a horizontal flexure web bridging one of the end cut-outs at each end of the load cell.

Thus, with reference to the left section of FIG. 6, the load cell again includes upper and lower cut-outs defining upper and lower horizontal load carrying arms 39 and 40. Again, opposite recesses between the cut-outs define a shear web 41 and appropriate upper and lower vertical flexure webs 42 and 43 are defined by a vertical cut-out the same as described with respect to FIG. 1. Between the flexure webs 42 and 43 is a vertical load-carrying leg 44 corresponding to the leg 24 of FIG. 1

Referring to the end portion of the load cell, there are again provided end cut-outs defining a vertical flexure web 45. However, and as mentioned heretofore, one of the cut-outs is not bridged, but simply defines a slot 46 so that the end 37 transmits forces to the load cell solely by way of the vertical flexure web 45. Greater sensitivity is realized for smaller forces when the horizontal flexure web is omitted and a simple slot 46 formed as described.

As mentioned, the remaining portion of the load cell to the right of the plane P in FIG. 6 is a mirror image and thus essentially identical to that described to the left of the plane P.

Figure 7:
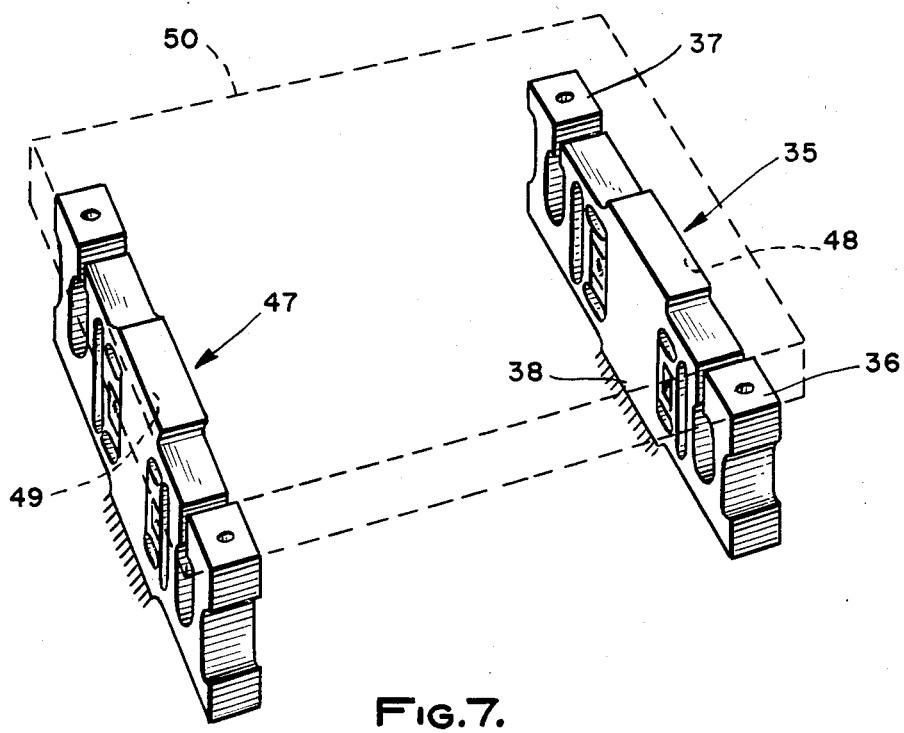
FIG. 7 is a schematic perspective view illustrating the manner in which two of the load cells shown in FIG. 6 would be used to support a platform in providing a weighing scale.

FIG. 7 illustrates the load cell 35 together with an additional load cell 47 essentially identical to the load cell 35 disposed with the load cell 35 beneath opposite edges 48 and 49 of a rectangular platform 50 illustrated in phantom lines to avoid obscuring the load cells. It will be understood that the opposite ends, such as 36 and 37 of the load cell 35 engage the corners of the platform 50, the other opposite corners being engaged by the opposite ends of the load cell 47. The central portions of the load cells such as indicated at 38 for the load cell 35 are secured to a stationary structure.

When a force is applied to the platform 50 the same will be transmitted to the shear webs of the load cells of FIG. 7 and extraneous moments will be isolated since the action is essentially the same as that described for the load cell of FIG. 1.

From all of the foregoing, it will be evident the present invention has provided yet further improved flexure isolated integrally formed load cells wherein shear webs can be employed to great advantage in providing improved accuracy in weighing scales even though off-center loading may occur.

I claim:

1. A flexure isolated shear web load cell including a generally rectangular integral body having first and second ends for securement respectively to a stationary structure and a platform, said body having (a) upper and lower symmetrical elongated cut-outs defining with the upper and lower exterior portions of said body load carrying horizontal arms, said body further having (b) recesses on its opposite sides between said upper and lower cut-outs defining a thinned wall portion functioning as a vertical shear web to which strain gauges are attachable, said body further including (c) a vertical elongated cut-out having opposite ends adjacent to the ends of said upper and lower cut-outs closest to the second end of said body to define upper and lower flexure webs lying in a vertical plane normal to the plane of said shear web and further defining with the near vertical walls of said recesses (d) a load carrying vertical leg, and said body further including end cut-outs defining (e) a vertical flexure web lying in a vertical plane parallel to said upper and lower flexure webs in alignment with the point of securement of said second end of the body to a platform whereby a force applied by the platform is transmitted to said shear web by way of said upper and lower arms and said vertical leg, said vertical flexure web and upper and lower flexure webs isolating from said shear web extraneous moments caused by off-center loading of any platform to which said second end of the body is secured.

2. A load cell according to claim 1, including a horizontal flexure web extending between the upper portion of said second end of said body where it is to be secured to a platform and the remaining portion of said body to bridge one of said end cut-outs and stabilize said second end relative to said vertical flexure web when a relatively heavy force is applied.

3. A load cell according to claim 1, including strain gauge means secured to said shear web and formed in sections at 45° to the vertical, responsive respectively to tension and compression strains generated in said shear web.

4. A load cell according to claim 1, including, in combination, a platform secured at a first portion to said second end of said load cell, there being included at least one additional load cell identical to said first mentioned load cell and positioned to support said platform at a point spaced from said first point.

5. A flexure isolated shear web load cell including a generally elongated rectangular block having opposite ends for securement to a platform and a central portion for securement to a stationary structure, the portions of said body on either side of a vertical center plane passing through said central portion of said body being symmetrical with respect to said plane, each end portion including (a) upper and lower symmetrical elongated cut-outs defining with the upper and lower exterior portions of said end portion load carrying horizontal arms, said end portion further having (b) recesses on its opposite sides between said upper and lower cut-outs defining a thinned wall portion functioning as a vertical shear web to which strain gauges are attachable, said end portion further including (c) a vertical elongated cut-out having opposite ends adjacent to the ends of said upper and lower cut-outs closest to the end of said second end portion to define upper and lower flexure webs lying in a vertical plane normal to the plane of said shear web and further define with the near vertical walls of said recesses (d) a load carrying vertical leg, and said end portion further including end cut-outs defining (e) a vertical flexure webs lying in a vertical plane parallel to said upper and lower flexure webs and in alignment with the point of securement of said end to a platform whereby a force applied by the platform is transmitted to said shear web by way of said upper and lower arms and said vertical leg, said vertical flexure web and upper and lower flexure webs isolating from said shear web extraneous moments caused by off-center loading of any platform to which said end of the end portion is secured.

6. A load cell according to claim 5, including strain gauge means secured to the shear webs of each end portion, said strain gauge means being formed in sections at 45° to a vertical and responsive respectively to tension and compression stresses generated in the shear webs.

7. A load cell according to claim 5, including, in combination, a rectangular platform, there being provided an additional load cell identical to said first mentioned load cell, the first and additional load cells being disposed beneath opposite edges of said rectangular platform for supporting the same

* * * * *